June 10, 1924.

R. N. ALLABACH 1,497,054

AUTOMATIC SHUT-OFF VALVE

Filed Dec. 19, 1921

INVENTOR.
Rodney N. Allabach
BY
ATTORNEY

Patented June 10, 1924.

1,497,054

UNITED STATES PATENT OFFICE.

RODNEY N. ALLABACH, OF STOCKTON, CALIFORNIA.

AUTOMATIC SHUT-OFF VALVE.

Application filed December 19, 1921. Serial No. 523,298.

*To all whom it may concern:*

Be it known that I, RODNEY N. ALLABACH, a citizen of the United States, residing at Stockton, county of San Joaquin, State of California, have invented certain new and useful Improvements in Automatic Shut-Off Valves; and I do declare the following to be a full, clear, and exact description of the same, reference being had to the accompanying drawing, and to the characters of reference marked thereon, which form a part of this application.

This invention relates to improvements in plumbing accessories, and particularly to an automatic valve especially intended to be interposed in the water piping of all buildings provided with faucets and hydrants, such as residences, factories, office buildings and the like.

The fiber, rubber, or composition gaskets or even the all-metal valves, which form the closure members of the majority if not all of the faucets and cocks used in ordinary water-pressure piping systems sooner or later become worn so that the faucets are not water-tight, resulting in a constant dropping of water therefrom, which is not only a waste of water but is very often a source of annoyance on account of the continual noise made by the drops when they strike. In any event, such leakage is undesirable.

Heretofore, it has been necessary, in order to replace or repair the leaky members, to shut off the water pressure of the building. In the case of the average residence, this means going into the basement, if such exists, or crawling under the house, which is a very inconvenient and dirty job in a good many instances.

In office buildings and the like, the main valve is usually handier, but its shutting off cuts the water supply off from at least an entire floor at a time, to the inconvenience of the tenants.

The principal object of my invention therefore is to eliminate the above named inconveniences by the provision of an automatic shut off valve interposed in the piping ahead of each faucet, and arranged to be closed only by the removal of the faucet itself.

In this manner any leaky faucet may be removed at any time for repairs without disturbing any others, and without shutting off the water supply to these others.

Another object is to provide a device of so simple a character that even if not disturbed or caused to be actuated for a long period of time, it will still function satisfactorily, and which may be made so inexpensive that the additional cost of a complete installation of these valves in the piping system of a building will be negligible.

These objects I accomplish by means of such structure and relative arrangement of parts as will fully appear by a perusal of the following specification and claims.

In the drawings similar characters of reference indicate corresponding parts in the several views.

Figure 1:
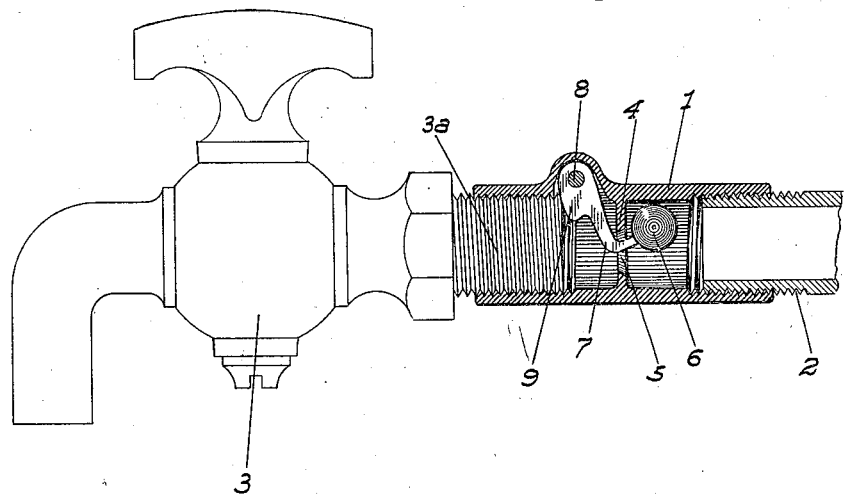
Fig. 1 is a sectional view of my improved valve, shown in connection with a faucet, the valve being then open.
Figure 2:
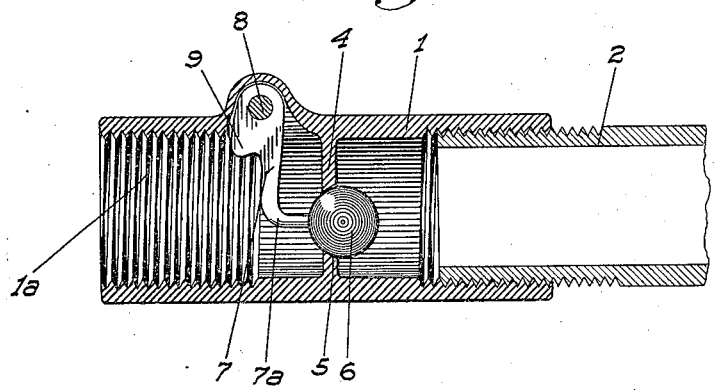
Fig. 2 is an enlarged section of the valve with the faucet removed, the valve being then closed.

Referring now more particularly to the characters of reference on the drawings, the numeral 1 denotes a casing or sleeve tapped at both ends, and of the general size and shape of an ordinary sleeve-coupling.

This sleeve is interposed between the supply pipe 2 and a faucet or other form of valve 3, both of which screw into the sleeve.

Intermediate the tapped portions of the sleeve is a transverse wall 4, provided with a circular and preferably tapered or sloping sided hole 5, the slope being inwardly toward the end of the sleeve in which the member 3 is screwed.

Arranged to seat in the large end of the hole, that is, on the side of the wall 4 opposite the faucet 3 is a ball 6 preferably of rubber or some similar flexible material, to which is connected an arm 7, extending through the hole 5 and thence at a right-angle bend as at 7ª to a pivotal pin 8 fixed in the sleeve adjacent the periphery thereof and tangential thereto.

As soon as the faucet is unscrewed the pressure holding the ball away from its seat, and the weight of the arm and ball, aided by the pressure of water thereagainst, will cause the ball to seat and thus automatically shut off the water.

I have particularly described this device in connection with a faucet or hydrant, but it is evident that it may be interposed in a pipe line just ahead of any piece of pipe which it may at any time be desirable to remove, since any pipe screwed into the sleeve will actuate the valve.

From the foregoing description it will be readily seen that I have produced such a device as substantially fulfills the objects of the invention as set forth therein.

While this specification sets forth in detail the present and preferred construction of the device, still in practice such deviations from such detail may be resorted to and do not form a departure from the spirit of the invention as defined by the appended claims.

Having thus described my invention, what I claim as new and useful and desire to secure by Letters Patent is:

1. An automatic valve comprising a sleeve member adapted for connection at one end to a permanent pipe, the other end being tapped, a transverse wall in the sleeve intermediate the ends, and provided with an orifice, a valve member arranged to seat in the orifice, an arm connected to the valve member and projecting through the orifice, a pivotal pin for such arm fixed in the sleeve adjacent the periphery thereof, said arm projecting into the plane of the threads of the sleeve both radially and longitudinally thereof, when the valve is seated in the orifice, whereby the inner end adjacent the periphery of a member screwed into the sleeve will bear against the arm and force the ball from its seat.

2. An automatic valve comprising a horizontal sleeve member adapted at one end for connection to a pipe fitting, a transverse orificed wall in the sleeve, an arm pivoted in the sleeve above the center line thereof and outwardly of the wall, said arm projecting toward the orifice therein, means projecting from the arm for engagement with the inner end of a removable member fitted into the outer end of the sleeve, and a weighted valve for closing the orifice secured on the arm and located on the opposite side of the wall from said arm.

3. An automatic valve comprising a sleeve member adapted at one end for connection to a pipe fitting, a transverse orificed wall in the sleeve, an arm pivoted in the sleeve to one side of the central plane thereof and outwardly of the wall, said arm projecting toward the orifice therein, means projecting from the arm for engagement with the inner end of a removable member when the latter is fitted into the outer end of the sleeve, a valve for closing the orifice secured on the arm and located on the side of the wall opposite said arm, and means tending to cause said valve to constantly seat over the orifice.

In testimony whereof I affix my signature.

RODNEY N. ALLABACH.